Aug. 7, 1928.  
G. O. W. HEIJKENSKJOLD  
1,680,043  
PREPARATION OF YEAST  
Filed Feb. 6, 1926
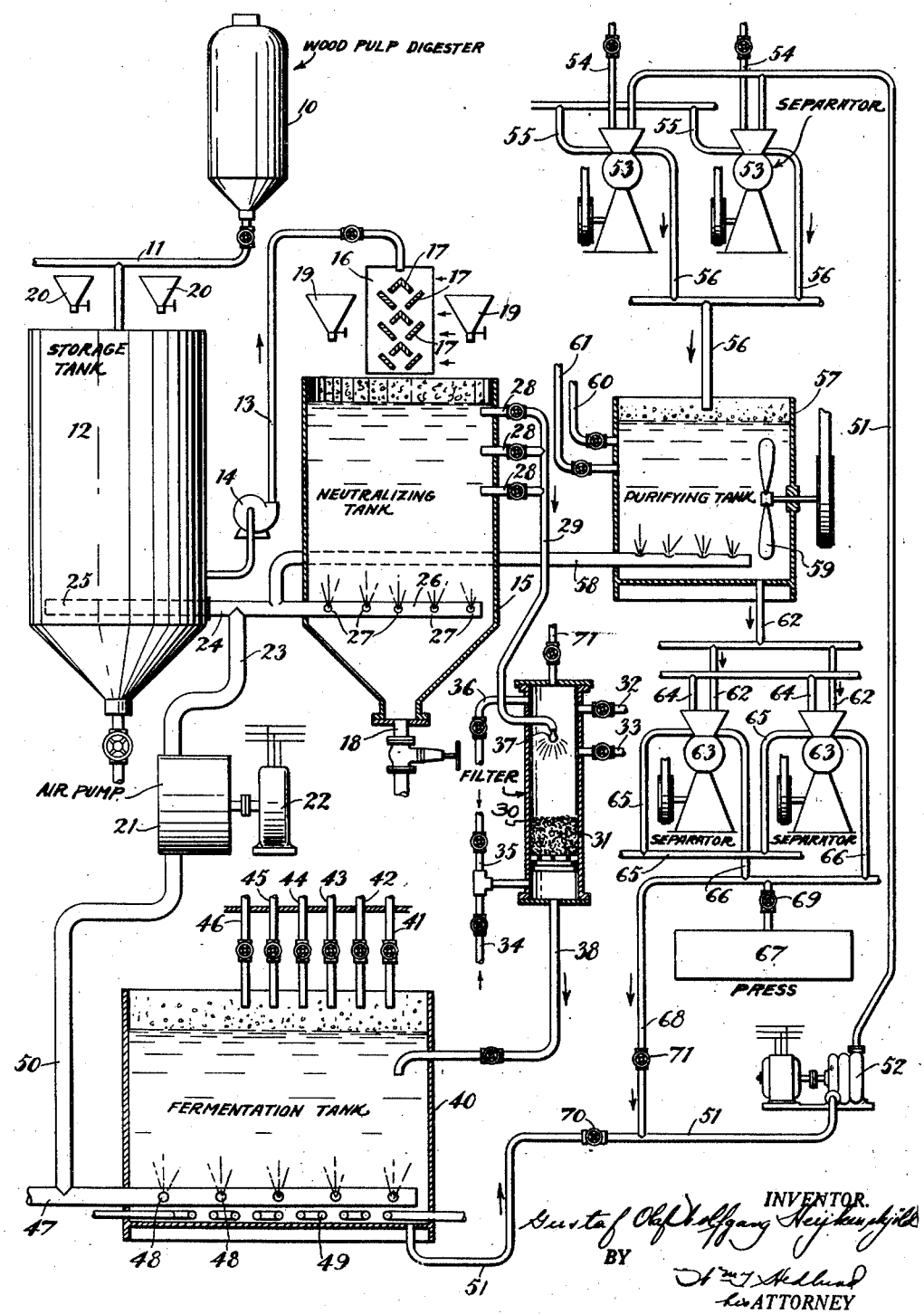

Patented Aug. 7, 1928.

1,680,043

UNITED STATES PATENT OFFICE.

GUSTAF OLAF WOLFGANG HEIJKENSKJÖLD, OF STOCKHOLM, SWEDEN, ASSIGNOR TO AKTIEBOLAGET BÄSTA, OF STOCKHOLM, SWEDEN, A CORPORATION OF SWEDEN.

PREPARATION OF YEAST.

Application filed February 6, 1926, Serial No. 86,530, and in Sweden March 28, 1925.

My invention comprises novel method and apparatus for manufacturing yeast and has for its purpose to produce yeast from the waste liquor of sulphite digesters which is marketable, of the quality as high as and higher than yeast produced from grain or molasses and which is considerably cheaper and easier to manufacture. My invention also comprises a new product.

The invention comprises the method and apparatus hereinafter more fully described and the novelty of which will be particularly pointed out and distinctly claimed.

In order to better illustrate my invention I have in part disclosed the same by means of the accompanying drawing which shows a preferred arrangement of parts with which the method of my invention can be carried out.

Referring more particularly to the drawing, 10 designates a wood pulp digester in which pulp is cooked and from which, after the cooking operation, there is discharged waste sulphite liquor, the digester shown being intended to indicate one in which the sulphite process of digesting takes place. The digester may be one of several. Waste sulphite liquor is discharged through conduit 11 and enters storage tank 12. From storage tank 12 the liquor is pumped through conduit 13 by means of pump 14 into neutralizing tank 15. Before passing into the neutralizing tank the liquor is caused to flow over the surface cooler and aerator 16. The aerator consists of members 17 affording large surfaces over which the liquor flows downwardly in series, thus presenting a large surface for contact with air whereby the impurities in the liquor are oxidized so that they will precipitate in the neutralizing tank and whereby the liquor is cooled. The aerator also has the function of reducing the sulphur dioxide content of the liquor, thus improving the liquor as a wort for manufacture of yeast, the sulphur dioxide being carried away by the air passing through the aerator between members 17. Similarly other substances, existing in the liquor, as acids, are carried away by the air and the yeast producing quality of the liquor improved.

If desired, the storage tank 12 could be omitted and the waste sulphite liquor be introduced directly into neutralizing tank 15 but it is more practical to use a separate storage tank because the aeration afforded by the flow of the liquor over members 17 is highly desirable to a proper attainment of a high quality of product and when digesters are discharged the liquor flows out at so high a rate that it cannot be sufficiently cooled down with a reasonably proportioned surface aerator. The discharge of a digester takes place in a relatively few minutes, for example, 15 minutes, while by continually passing a small amount of liquor over members 17 a more intensive aeration is obtained and a smaller aerator can be used. If the waste liquor were allowed to flow directly into neutralizing tank 15, a recirculation from the neutralizing tank through the aerator 16 and back to the neutralizing tank would be necessary and even this would not give as good results as the arrangement shown. If desired, some means for cooling the waste sulphite liquor passing from the digester to the storage tank may be used.

The sulphite waste liquor contains, besides about two and one-half percent of sugar, also about twelve percent of other organic substances, chiefly in colloidal state and also sulphuric acid. The purpose of a neutralizing tank is principally to compensate for the acidity of the liquor. By "compensate" is meant the addition of alkaline acting substances to the liquor to such an extent that new yeast cell development is not retarded. It is preferred to add so much of such substance that the liquor becomes alkaline. In the subsequent cultivation process the liquor again becomes acid. By then adding small quantities of acid or alkaline substances from time to time required, the liquor may be maintained at the most suitable acidity. As preferred agents for this compensating treatment, I use ammonia and powdered limestone. Powdered limestone is used because it not alone reduces the acidity but also acts as a precipitator, causing precipitation of material in solution in the liquor, the precipitant gathering in the lower part of the neutralizing tank from which it may be blown out through blow-off pipe 18. The additional important effect is obtained by the use of limestone that the limestone and the precipitate formed by the limestone carry with them, on slowly sinking to the bottom of the neutralizing tank, the impurities suspended in the liquor in colloidal form. Besides reacting with sulphuric acid, limestone reacts with soluble bi-sulphite of calcium in forming insoluble neutral sulphite of calcium which, on depositing, carries with it colloidal matters. Reference character 19 designates hoppers serving to hold the comminuted limestone and to discharge the same into the neutralizing tank. The quantity of neutralizing matter added depends, in part, upon the associated steps of the process and is preferably such that the liquor becomes alkaline. If sulphate leach is readily at disposal, this substance may also be used as a neutralizing agent. The sulphate leach or sulphate waste product from sulphate mills usually consists of about 90% calcium carbonate and small quantities of sodium aluminum hydrate, etc., from the leach used for cooking the sulphate pulp. This sulphate waste product or leach is obtained in the form of a grey powder and is a comminuted, precipitate forming substance, the calcium carbonate on addition to sulphite liquor acting as a neutralizer for acid solutions because the sulphur acids react with the calcium, carbon dioxide being liberated.

It is possible to expedite the work in the neutralizing tank by causing some neutralization of the liquor to take place in storage tank 12 and for this purpose hoppers 20 are placed above storage tank to discharge limestone into the same.

To obtain clear liquor air is blown through the body of liquor in the neutralizing tank and the same may be done in the storage tank. Air is supplied by compressor 21 driven, for example, by an electric motor 22 and passes through conduits 23, 24, 25, 26 and 27 into the neutralizing tank and the storage tank. Conduit 26 extends through the middle of the neutralizing tank and conduits 27 branch off from conduit 26. Holes are provided in the various conduits within the tanks. The air is blown in at the bottom through a large number of very small holes to obtain the smallest possible bubbles and thus secure maximum aeration surface. The bubbles join in ascending, thus reducing the aeration surface; the amount of air blown in per square foot is therefore a gage for the aeration surface obtained, an amount greater than 400 cubic feet of air per square foot of cross-section of the liquor being satisfactory.

The purpose of aeration at this stage of the manufacture is two-fold. First, the air oxidizes substances in solution which would otherwise later become oxidized and precipitate in the fermentation tank and which would hamper the process in the later stages. The precipitate thus formed by oxidation in the neutralizing tank is carried away with other impurities. Secondly the air serves to continually agitate the powdered limestone so that it contacts with all portions of the liquor and thus an improved reaction is obtained.

After neutralization in the neutralizing tank has taken place and a sufficient period has been allowed for complete precipitation of all solid matter in the liquor, the clear liquor is drawn off by means of pipes 28 which connect with conduit 29 passing to filter 30. Filter 30 contains a filtering material 31 which preferably consists of malt sprouts although other substances, as, for example, sand, may be used. I prefer malt sprouts because it furnishes nutriment to some extent and even when the nutritive qualities have been exhausted it gives a highly clarified liquor provided it is kept sterile. Furthermore, the malt sprouts act to transform inorganic non-nutritive salts to organic nutritive salts. The filtering of the liquor through even a small quantity of malt sprouts facilitates assimilation of nitrogen from inorganic salts, such as ammonium sulphate, ammonia, etc., in the yeast to a remarkable degree, even when the malt sprouts filter has been used to filter so much liquor that there is no organic nitrogen salt left in the malt sprouts. If desired, a combination filter of malt sprouts and sand or a filter containing different substances arranged in series may be used. The malt sprouts and the sand have quite different purposes, the malt sprouts facilitating assimilation of nitrogen from inorganic salts, but acting only as a coarse filtering medium; the sand functions as a fine filtering substance, and is particularly useful for rapid filtering subsequent to filtration through the malt sprouts.

Pipe 33 serves to supply a solution of hydrolyzable salt to the filter. This addition of a hydrolyzable salt, which may, for instance, be aluminium sulphate, is used when the filtering material consists of sand. The hydrolyzable salt causes a film on the surface of the sand filter which film acts itself as a filter to retain such impurities as coloring matters and bacteria.

By means of pipe 71 I add ammonia to the filter. This need not be done if enough ammonia has been added in the neutralizing tank to sufficiently compensate for acidity and supply the nutriment necessary but it is preferred to limit the amount of ammonia added in the neutralizing tank and regulate the ammonia content by addition of this substance in some form to the filter. It is preferred to add the ammonia to the filter rather than adding it to the fermentation tank since the filter can thus serve to cleanse the ammonia solution.

After having filtered all the liquor necessary for one propagation through the filter, and the passage of liquor through the same is stopped, there remain sugar substances and other yeast nutriments in the filter which may be washed out and utilized in the fermentation tank by causing fresh water to pass through pipe 32 into and through the filter.

To clean the filter after use, water is supplied through pipe 34 connected to the lower part of the filter, which water passes upwardly through the filtration bed and is allowed to pass out through pipe 36. In order to sterilize the filter, steam is admitted in similar manner through pipe 35. The liquor is preferably sprayed into the filter as indicated at 37.

From the filter the liquor passes through conduit 38 into fermentation tank 40 in which the production of yeast takes place in the liquor or wort. Provision is made for the supply of additional nutritive substances necessary for growth of yeast to the fermentation tank. The nutritive substances supplied depend upon the final characteristics of the yeast, upon the characteristics of the wort, and upon the characteristics of the seed yeast and may be varied. 41 designates a supply pipe for phosphoric acid. 42 designates a supply pipe for ammonia which may be supplied in any desired form. 43 designates a supply pipe for molasses. 44 designates a supply pipe for a solution of ammonium phosphate. 45 designates a supply pipe for a neutralizer. Obviously the substances may be added in any manner, as, for example, by simply pouring the respective substances from containers into the fermentation tank.

I begin the fermentation by placing in tank 40 a relatively small amount of liquid containing a higher percentage of sugar than the percentage of sugar in the liquor supplied through conduit 38. This is preferably done by adding molasses to a small amount of the clear sulphite liquor. It may also be done by separately concentrating a portion of the sulphite liquor after passing through the filter and placing the seed yeast in this concentrated solution. Due to the high percentage of sugar in the concentrated solution there is a rapid initial cultivation of yeast. As the fermentation progresses liquor is added gradually through conduit 38 and the necessary nutritive substances are added in the desired amount. Due to the rapid initial cultivation the yeast cells are in full work when the sulphite liquor is added, and are able to assimilate the sugar and resist the toxines in the sulphite liquor. In producing yeast from sulphite waste liquor it has previously proven difficult to obtain good yields in the time normally required for producing yeast from the raw materials hitherto used. This is due to the fact that the fermenting power of the seed yeast is not sufficient for effecting a growth of the yeast at the rate desired in the unfavorable nutritive liquor used which is more or less poisonous to the yeast in its original condition.

I have found, however, that the yield can be considerably increased, and the time of fermentation much reduced, by first planting the seed yeast in a solution, the percentage of sugar of which is higher than that of the solution or solutions supplied to the fermentation tank during fermentation.

During fermentation a great quantity of air is supplied to the fermentation tank through conduits 47, 48 and 50, the quantity of air supplied being so great that the cultivation of yeast is stimulated and the formation of alcohol substantially prevented. The quantity of air supplied is so great that the poisonous gases of sulphur are driven off and the yeast permitted to grow despite the poisonous effect of the wort. To obtain the best results I find it necessary to use at least 400 cubic feet of air for each square foot of surface of wort liquor in the fermentation tank.

The process of fermentation gives off considerable heat which is taken away by cooling water pipes 49.

It is thus seen that the fermentation process begins with a wort highly concentrated in sugar. As the fermentation progresses the concentration of sugar decreases to amounts sufficient for appropriate fermentation, this being effected by the continual addition of sulphite liquor and the addition of other nutriments as the yeast may need them. However, the sugar concentration is highest at the beginning. The level of wort rises in fermentation tank as more liquor is successively added. When tests show a concentration of nutriments higher than is desired, water is also added which also raises the level in the fermentation tank. Under the process above outlined the concentration is high at first and then decreases, and continues along a curve which is more or less varying.

The seed yeast used is prepared separately from the main process in a solution or solutions containing an unusually high degree of nitrogenous matter. The growth of yeast depends in a large measure on the available quantity of albumens and other easily assimilable nitrogen compounds. Yeast cells have the property of being able to store considerable nitrogen which can be utilized for propagation of the yeast when the yeast is placed in a solution which is weak in nitrogen compounds. By thus separately growing yeast in a solution containing a large amount of nitrogen a seed yeast is produced which is capable of rapid growth in sulphite liquor which may be relatively weak in nitrogen because the seed yeast can make use of the nitrogen stored up in itself. This growth of seed yeast in a manner to cause the same to accumulate nitrogen I term super-nourishment.

The super-nourishment of the seed yeast should be carried as far as possible, and beyond 2.5% of nitrogen content of the seed yeast. If not carried to a sufficiently high degree to obtain the desired effect, the missing quantity of nitrogen may be made up by addition of malt sprouts. This supply of nitrogen by malt sprouts may be that afforded by the malt sprouts in the filter, the amount added in the filter being regulated in accordance with the amount of nitrogen required. If malt sprouts are added without super-nourishment, it requires more than 200 kilograms malt sprouts per 1000 kilograms of sugar in the wort. By super-nourishment to even a limited extent, the amount of malt sprouts necessary can be reduced considerably below 200 kilograms per 1000 kilograms sugar, a matter of considerable saving in view of the high cost of malt sprouts. I have been able, by this method, to reduce the amount to 50 kilograms per 1000 kilograms sugar.

After the liquor for any fermentation has been used, the aeration continues until the nourishment in the wort is used up. The supply of air is then cut down and the yeast is drawn off through conduit 51 by means of pump 52 which forces the same to centrifugal separators 53. I have shown the pump 51 merely for convenience of illustration. It would obviously be preferable to place the separators below tank 40 and allow flow thereto simply by gravity.

Before passing to the separators, the wort is neutralized in order to prevent corrosion of the separators. This may be done by adding a basic substance to the fermentation tank just before withdrawal of the yeast or by injecting a basic material into conduit 51. The amount of neutralizing agent added should be such as to leave the liquid neutral or slightly acid.

Water is supplied to separators 53 by means of conduits 54. This water serves to dilute the wort and as the yeast is separated from the wort by the action of the centrifugal separators, to replace the concentrated wort which remains between the yeast cells by pure water and liquor of low concentration. The separated wort, diluted, passes out through conduits 55. The yeast passes through conduits 56 into purifying tank 57.

In tank 57 the yeast is further washed and at the same time it is aerated by means of air supplied through conduit 58. The air serves to keep the liquid in tank 57 in continuous motion. If desired a propeller 59 driven by any suitable means may be used for this purpose alternately with or in addition to the supply of air. Water is supplied to tank 57 by way of conduits 60 in order to dilute the remaining sulphite wort and to clean the yeast. If necessary hydrochloric acid is added, for example, by means of conduit 61 to acidify the yeast to the desired extent.

From tank 57 the yeast and diluted wort pass through conduits 62 into a second set of separators 63 which operate in similar manner as separators 53. Fresh water is also supplied to these separators through conduits 64. The liquid separated in separators 63 passes out through conduits 65 and the yeast passes through conduits 66. Since it is desirable that a repeated separation of the yeast take place it is preferred that, after having gone through separators to the extent described, the yeast be conducted through conduit 68, valves 69 and 70 being closed and valve 71 being open, and thence returned through conduit 51 to separators 53 to again go through the process of separation above outlined. After the yeast has passed through the separators again it is permitted to pass to the usual press indicated by reference character 67, in which latter case valve 69 is open and valve 71 closed. As above pointed out it is of great importance to the obtaining of good results that the yeast be washed and separated repeatedly so that all or substantially all of the sulphite liquor will be removed from the yeast.

While I have described in detail the preferred embodiment of my invention, it is to be understood that the invention is not limited to the precise embodiment disclosed but may be varied in various aspects and that various of the novel steps of my method may be used in combination with other known steps other than those set out.

Having thus described my invention what I claim is:

1. The method of cultivating yeast and utilizing acid sulphite waste liquor which comprises reducing the acidity of the sulphite waste liquor at least to the neutral point, filtering the liquor, cultivating the yeast under aeration while preventing formation of alcohol in a culture medium comprising the liquor so treated, and separating the yeast from the liquid.

2. The method of cultivating yeast and utilizing acid sulphite waste liquor which comprises reducing the acidity of the waste sulphite liquor at least to the neutral point, cultivating yeast in the liquor under aeration, separating the yeast from the liquid, and repeatedly washing the separated yeast to remove sulphite waste liquor traces.

3. The method of cultivating yeast and utilizing acid sulphite waste liquor which comprises reducing the acidity of the sulphite waste liquor at least to the neutral point, cultivating seed yeast which has been propagated in a wort of high sugar concentration in order to produce a rapid initial cultivation of yeast, continuing yeast cultivation in a culture medium comprising said wort and sulphite liquor so treated, and separating the yeast from the liquid.

4. The method of cultivating yeast and utilizing acid sulphite waste liquor which comprises reducing the acidity of the sulphite waste liquor at least to the neutral point, cultivating seed yeast which has been prepared in a solution of high concentration of yeast-assimilable chemically combined nitrogen, in a culture medium comprising the liquor so treated and separating the yeast from the liquid.

5. The method of cultivating yeast and utilizing acid sulphite waste liquor which comprises reducing the acidity of the sulphite waste liquor by adding a substance to make the sulphite liquor alkaline, cultivating yeast while preventing formation of alcohol in a culture medium comprising the liquor so treated and separating the yeast from the liquid.

6. The method of cultivating yeast and utilizing acid sulphite waste liquor which comprises reducing the acidity of the sulphite waste liquor at least to the neutral point, cultivating yeast which has been planted in a wort of high sugar concentration in order to produce a rapid initial cultivation of yeast, in a culture medium comprising said wort and sulphite liquor so treated, aerating the wort, separating the yeast from the liquid, and repeatedly washing the separated yeast.

7. The method of cultivating yeast and utilizing acid sulphite waste liquor which comprises reducing the acidity of the sulphite waste liquor at least to the neutral point, cultivating seed yeast which has been prepared in a solution of high concentration of yeast-assimilable chemically combined nitrogen in a culture medium comprising the liquor so treated, and separating the yeast from the liquid by repeatedly washing the yeast.

8. The method of cultivating yeast and utilizing acid sulphite waste liquor which comprises reducing the acidity of the sulphite waste liquor at least to the neutral point, filtering the treated liquor, cultivating yeast while preventing formation of alcohol in a culture medium comprising the liquor so treated while aerating the medium, and separating the yeast from the liquid.

9. The method of cultivating yeast and utilizing acid sulphite waste liquor which comprises reducing the acidity of the sulphite waste liquor at least to the neutral point, filtering the treated liquor, cultivating yeast in a culture medium comprising the liquor so treated while aerating the medium, separating the yeast from the liquid and repeatedly washing the separated yeast to remove sulphite waste liquor traces.

10. The method of cultivating yeast and utilizing acid sulphite waste liquor which comprises reducing the acidity of the sulphite waste liquor at least to the neutral point, cultivating yeast in a culture medium comprising the liquor so treated while blowing a great quantity of air through the medium to such an extent that cultivation of yeast is stimulated and formation of alcohol substantially prevented, separating the yeast from the liquid, and repeatedly washing the separated yeast.

11. The method of cultivating yeast and utilizing acid sulphite waste liquor which comprises reducing the acidity of the sulphite waste liquor at least to the neutral point, planting propagative seed yeast which has been prepared in a solution of high concentration of yeast-assimilable chemically combined nitrogen, in a wort of high sugar concentration in order to produce a rapid initial cultivation of yeast, continuing the yeast propagation by adding liquor so treated, aerating the wort and separating the yeast from the liquid.

12. The method of cultivating yeast and utilizing acid sulphite waste liquor which comprises reducing the acidity of the sulphite waste liquor at least to the neutral point, filtering the treated liquor, planting propagative seed yeast in a wort of high sugar concentration, adding the treated sulphite liquor and such additional yeast nutriments as may be desired to the wort, aerating the wort, and removing the liquor from the yeast.

13. The method of cultivating yeast and utilizing acid sulphite waste liquor which comprises reducing the acidity of the sulphite waste liquor at least to the neutral point, planting propagative seed yeast in a wort of high sugar concentration in order to produce a rapid initial cultivation of yeast, then continuing the yeast propagation in a culture medium comprising said wort, the liquor so treated, and additional nutriments as required, blowing a great quantity of air through the culture medium to such an extent that cultivation of yeast is stimulated and formation of alcohol substantially prevented, and separating the yeast from the liquid.

14. The method of cultivating yeast and utilizing acid sulphite waste liquor which comprises reducing the acidity of the sulphite waste liquor at least to the neutral point, planting propagative seed yeast in a wort of high sugar concentration in order to produce a rapid initial cultivation of yeast, adding the treated sulphite liquor and additional yeast nutriments required for producing new yeast cells to the wort, aerating the wort, separating the yeast from the liquid, and washing the yeast.

15. The method of cultivating yeast and utilizing acid sulphite waste liquor which comprises reducing the acidity of the sulphite waste liquor by adding a substance such that the sulphite liquor becomes alkaline, cultivating yeast in the liquor so treated under aeration, separating the yeast from the liquid, and washing the yeast, to remove sulphite waste liquor traces.

16. The method of cultivating yeast and utilizing acid sulphite waste liquor which comprises reducing the acidity of the sulphite waste liquor at least to the neutral point, filtering the liquor, propagating seed yeast in a solution of high concentration of yeast-assimilable chemically combined nitrogen, then continuing yeast cultivation under aeration, in a culture medium comprising the liquor so treated, and separating the yeast from the liquid.

17. The method of cultivating yeast and utilizing acid sulphite waste liquor which comprises reducing the acidity of the sulphite waste liquor at least to the neutral point, filtering the liquor, cultivating seed yeast which has been propagated in a solution of high concentration of yeast-assimilable chemically combined nitrogen under aeration in a culture medium comprising the liquor so treated, separating the yeast from the liquid, washing the yeast, and again separating further liquid from the yeast.

18. The method of cultivating yeast and utilizing sulphite waste liquor which comprises reducing the acidity of the sulphite waste liquor by adding a substance such that the sulphite liquor becomes alkaline, filtering the liquor so treated, cultivating yeast while preventing formation of alcohol under aeration in the treated filtered liquor, and separating the yeast from the liquid.

19. The method of cultivating yeast and utilizing sulphite waste liquor which comprises reducing the acidity of the sulphite waste liquor by adding a substance such that the sulphite liquor becomes alkaline, cultivating yeast in the liquor so treated while blowing a great quantity of air through to such an extent that cultivation of yeast is stimulated and formation of alcohol substantially prevented, and separating the yeast from the liquid.

20. The method of cultivating yeast and utilizing sulphite waste liquor which comprises reducing the acidity of the sulphite waste liquor at least to the neutral point, planting seed yeast propagated in a solution of high concentration of yeast-assimilable chemically combined nitrogen, in a wort of high sugar concentration in order to produce a rapid initial cultivation of yeast, continuing yeast cultivation by adding liquor so treated, aerating the wort, and separating the yeast from the liquid by repeatedly separating and washing the yeast.

21. The method of cultivating yeast and utilizing sulphite waste liquor which comprises reducing the acidity of the sulphite waste at least to the neutral point, filtering the treated liquor, planting seed yeast propagated in a solution of high concentration of yeast-assimilable chemically combined nitrogen, in a wort of high sugar concentration in order to produce a rapid initial cultivation of yeast, continuing yeast cultivation in a culture medium comprising the said wort, the treated sulphite liquor, and such additional yeast nutriments as may be required, aerating the culture medium, and separating the yeast from the liquid.

22. The method of cultivating yeast and utilizing sulphite waste liquor which comprises reducing the acidity of the sulphite waste at least to the neutral point, filtering the treated liquor, planting seed yeast propagated in a solution of high concentration of yeast-assimilable chemically combined nitrogen, in a solution of high sugar concentration in order to produce a rapid initial cultivation of yeast, continuing yeast cultivation in a culture medium comprising said wort and the treated sulphite liquor, aerating the culture medium, and separating the yeast from the liquid by repeated washings.

23. The method of cultivating yeast and utilizing sulphite waste liquor which comprises reducing the acidity of the sulphite waste liquor by adding a substance such that the sulphite liquor becomes alkaline, filtering the treated liquor, planting seed yeast propagated in a solution of high concentration of yeast-assimilable chemically combined nitrogen, in a wort of high sugar concentration in order to produce a rapid initial cultivation of yeast, continuing yeast cultivation in a culture medium comprising said wort and the treated sulphite liquor, aerating the culture medium, and separating the yeast from the liquid by repeated washings and separations.

24. The method of cultivating yeast and utilizing sulphite waste liquor which comprises reducing the acidity of the sulphite waste liquor by adding a substance such that the sulphite liquor becomes alkaline, filtering the liquor, planting seed yeast propagated in a solution of high concentration of yeast-assimilable chemically combined nitrogen, in a wort of high sugar concentration in order to produce a rapid initial cultivation of yeast, continuing the yeast cultivation in a culture medium comprising said wort, the treated sulphite liquor and such additional nutriments as may be necessary, blowing a great quantity of air through the culture medium to such an extent that the cultivation of yeast is stimulated and formation of 25. In a device for utilizing the acid waste liquor from a wood pulp digester, a neutralizing tank, means to conduct liquor from the digester to said neutralizing tank, a filter, means to conduct the treated liquor from said neutralizing tank to said filter, a fermentation tank, means to conduct the treated liquor from said filter to said fermentation tank, air discharge pipes within said neutralizing tank and within said fermentation tank, and means to supply air to said air pipes.

26. In a device for utilizing the acid waste liquor from a wood pulp digester, a neutralizing tank, means to conduct waste sulphite liquor from the digester to said neutralizing tank, an aerator arranged between the digester and said neutralizing tank through which the treated liquor passes, a filter, a fermentation tank, means to conduct the treated liquor from said filter to said fermentation tank, air pipes within said neutralizing and within said fermentation tank, and means to supply air to said air pipes.

27. The method of cultivating yeast and utilizing the acid waste liquor from sulphite digesters which comprises adding a comminuted, precipitate forming substance to the sulphite waste liquor to neutralize the acidity of the liquor while simultaneously precipitating impurities, cultivating yeast while preventing formation of alcohol in the treated liquor under aeration, separating the yeast from the liquid, and repeatedly washing the separated yeast.

28. The method of cultivating yeast and utilizing the acid waste liquor from sulphite digesters which comprises adding a comminuted, precipitate forming substance to the sulphite waste liquor to neutralize the acidity of the liquor while simultaneously precipitating impurities, separating the treated liquor from the precipitate, cultivating yeast which has been planted in a wort of high sugar concentration in order to produce a rapid initial cultivation of yeast, in a culture medium comprising said wort and the treated sulphite liquor, aerating the culture medium, and separating the yeast from the liquid.

29. The method of cultivating yeast and utilizing the acid waste liquor from sulphite digesters which comprises adding a comminuted, precipitate forming substance to the sulphite waste liquor to neutralize the acidity of the liquor while simultaneously precipitating impurities, separating the treated liquor from the precipitate, planting seed yeast propagated in a solution of high concentration of yeast-assimilable chemically combined nitrogen, in a wort of high sugar concentration in order to produce a rapid initial cultivation of yeast, continuing yeast cultivation in a culture medium comprising said wort and the treated sulphite liquor, aerating the culture medium, and separating the yeast from the liquid.

30. The method of cultivating yeast and utilizing the acid waste liquor from sulphite digesters which comprises reducing the acidity of the sulphite waste liquor at least to the neutral point, cultivating yeast in the treated liquor while blowing air through the same at a rate greater than 400 cubic feet of air for each square foot of cross-section of the body of liquor through which the air is blown, and separating the yeast from the liquid by repeatedly separating and washing the yeast.

31. The method of cultivating yeast and utilizing the acid waste liquor from sulphite digesters which comprises reducing the acidity of the sulphite waste liquor at least to the neutral point, cultivating seed yeast which has been super-nourished in a solution of high concentration of yeast-assimilable chemically combined nitrogen to an extent beyond 2.5% of nitrogen content of the seed yeast, in a culture medium comprising the treated liquor, and separating the yeast from the liquid.

32. The method of cultivating yeast and utilizing the acid waste liquor from sulphite digesters which comprises reducing the acidity of the waste sulphite liquor at least to the neutral point, planting seed yeast which has been super-nourished in a solution of high nitrogen content to an extent beyond 2.5% of nitrogen content of the seed yeast, in a wort of high sugar concentration to produce a rapid initial cultivation of yeast, continuing yeast cultivation in a culture medium comprising the treated sulphite liquor, aerating the culture medium, and separating the yeast from the liquid.

33. As an article of manufacture, a yeast adapted for baking purposes, prepared by propagation during aeration in a nutrient solution of high initial concentration comprising treated acid sulphite waste liquor, which concentration is diminished during the process of fermentation by continued addition of treated acid sulphite waste liquor.

34. The method of cultivating yeast and utilizing sulphite waste liquor which comprises reducing the acidity of the sulphite waste liquor at least to the neutral point, filtering the treated liquor through a body comprising malt sprouts, cultivating the yeast in the treated liquor under aeration, and separating the yeast from the liquid.

35. The method of cultivating yeast and utilizing sulphite waste liquor which comprises reducing the acidity of the sulphite waste liquor at least to the neutral point, filtering the liquor through a body comprising sand, cultivating the yeast in the treated liquor under aeration, and separating the yeast from the liquid.

36. The method of cultivating yeast and utilizing sulphite waste liquor which comprises reducing the acidity of the sulphite liquor at least to the neutral point, filtering the liquor through a body comprising malt sprouts and sand, cultivating the yeast in the treated liquor under aeration, and separating the yeast from the liquid.

37. As an article of manufacture, a yeast adapted for baking purposes, prepared by propagation during aeration in a nutrient solution of high initial sugar concentration comprising treated acid sulphite waste liquor, which concentration is diminished during the process of fermentation by continued addition of treated acid sulphite waste liquor and from which impurities have been removed by repeated washing and separating.

38. The method of utilizing worts toxic to yeast in cultivating yeast, which comprises beginning yeast propagation in a wort having a high concentration of yeast-assimilable chemically combined nitrogen and non-toxic to yeast to strengthen the yeast cells, and continuing the yeast propagation by adding a wort comprising sulphite waste liquor and toxic to yeast and containing yeast nutriments.

39. The method of utilizing worts toxic to yeast in cultivating yeast, which comprises beginning yeast propagation in a wort having a high concentration of yeast-assimilable chemically combined nitrogen and non-toxic to yeast consisting of water containing yeast nutrient material to strengthen the yeast cells, and continuing the yeast propagation by adding a wort comprising sulphite waste liquor and toxic to yeast containing yeast nutrient material.

40. The method of utilizing worts toxic to yeast in cultivating yeast, which comprises beginning yeast propagation in a wort non-toxic to yeast consisting of water containing a high concentration of sugar material and yeast nutrient salts to strengthen the yeast cells, and continuing yeast propagation by adding a wort comprising sulphite waste liquor and toxic to yeast containing yeast nutriments.

In testimony whereof I affix my signature.

GUSTAF OLOF WOLFGANG HEIJKENSKJÖLD.